(12) United States Patent
Bardazzi

(10) Patent No.: US 7,827,905 B2
(45) Date of Patent: Nov. 9, 2010

(54) ESPRESSO COFFEE MACHINE

(75) Inventor: Bruno Bardazzi, San Piero a Siev (IT)

(73) Assignee: EspressoCap S.r.l., Bareggio (MI) (IT)

( * ) Notice: Subject to any disclaimer, the term of this patent is extended or adjusted under 35 U.S.C. 154(b) by 120 days.

(21) Appl. No.: 12/036,307

(22) Filed: Feb. 25, 2008

(65) Prior Publication Data

US 2008/0141865 A1 Jun. 19, 2008

Related U.S. Application Data

(63) Continuation of application No. PCT/EP2006/065223, filed on Aug. 10, 2006.

(30) Foreign Application Priority Data

Sep. 14, 2005 (IT) ............ GE2005A0072

(51) Int. Cl.
 *A47J 31/24* (2006.01)
(52) U.S. Cl. .................. 99/289 R; 99/295
(58) Field of Classification Search ........... 99/279–323, 99/275–277, 349, 495, 357; 210/473, 477; 222/325

See application file for complete search history.

(56) References Cited

U.S. PATENT DOCUMENTS

| 1,467,778 | A | * | 9/1923 | Paola ................... 99/286 |
| 3,209,676 | A | * | 10/1965 | Zimmermann et al. .... 99/289 R |
| 3,229,612 | A | * | 1/1966 | Brown .................. 99/282 |
| 3,292,527 | A | * | 12/1966 | Stasse .................. 99/295 |
| 3,384,004 | A | * | 5/1968 | Perlman ................. 99/289 R |
| 4,029,003 | A | * | 6/1977 | Manaresi ................ 99/295 |
| 4,103,602 | A | * | 8/1978 | Oggioni et al. .......... 99/289 D |
| 4,253,385 | A | * | 3/1981 | Illy ..................... 99/281 |
| 4,484,515 | A | * | 11/1984 | Illy ..................... 99/282 |
| 5,104,666 | A | * | 4/1992 | Sanvitale ............... 426/77 |
| 5,127,318 | A | * | 7/1992 | Selby, III .............. 99/295 |
| 5,242,702 | A | * | 9/1993 | Fond ................... 426/433 |
| 5,343,799 | A | * | 9/1994 | Fond ................... 99/295 |
| 5,472,719 | A | * | 12/1995 | Favre .................. 426/77 |

(Continued)

FOREIGN PATENT DOCUMENTS

EP 1 050 258 A1 11/2000

(Continued)

*Primary Examiner*—Samuel M Heinrich
(74) *Attorney, Agent, or Firm*—Matthias Scholl, PC; Matthias Scholl

(57) ABSTRACT

Taught is an espresso coffee machine comprising a supply unit (101) supplying hot water; and filter-holder means (2, 102) for containing a pre-packaged measure (3) of coffee powder; said supply unit (101) and said filter-holder means (2, 102) being sealingly engaged with each other along a path of the engaging movement, said path of the engaging movement lying in a plane substantially perpendicular to the middle plane of engagement of said supply unit (101) and said filter-holder means (2, 102), the surfaces of said unit (101) supplying said filter-holder means (2, 102) coming into contact only upon engagement of the latter; and an ejection member (401) arranged in the vicinity of the periphery of said supply unit (101) and projecting perpendicularly with respect to the middle plane of engagement of said supply unit (101) and said filter-holder means (2, 102).

20 Claims, 4 Drawing Sheets

U.S. PATENT DOCUMENTS 5,680,809 A * 10/1997 Dings et al. ............... 99/289 D
6,490,966 B2 * 12/2002 Mariller et al. ........... 99/289 R
6,655,260 B2 * 12/2003 Lazaris et al. ................ 99/295
6,799,503 B2 * 10/2004 Kollep et al. ................. 99/295
2003/0071056 A1    4/2003 Hale

FOREIGN PATENT DOCUMENTS

WO       2005/002405 A2      1/2005
WO   WO 2005090196 A1 *   9/2005

* cited by examiner

ESPRESSO COFFEE MACHINE

CROSS-REFERENCE TO RELATED APPLICATIONS

This application is a continuation of International Patent Application No. PCT/EP2006/065223, with an international filing date of Aug. 10, 2006, which is based on Italian Patent Application No. GE2005A000072, filed Sep. 14, 2005. The contents of these specifications are incorporated herein by reference.

BACKGROUND OF THE INVENTION

1. Field of the Invention

The present invention relates to espresso coffee machines in which the coffee is introduced in the form of pre-filled cartridges, i.e., so-called "pods" or "capsules", or the like.

2. Description of the Related Art

Espresso coffee machines which until a few years ago were intended essentially for professional use are nowadays widespread also on a domestic level. In order to make the use of these machines simpler and more practical and standardize the qualitative standards of the product, namely the coffee dispensed, for some years pre-packaged measures of coffee powder have been provided, these being enclosed in water-permeable containers made of paper, plastic, aluminum or the like, which are commonly called capsules.

The espresso machine which uses this type of capsule is undoubtedly much simpler to use and provides a coffee infusion having characteristics which depend solely on the quantity of water used; basically those steps such as filling the filter and compressing it, which are not sufficiently automated for the product to be popular on a large scale, have been eliminated in practice. Moreover, the machine is very much cleaner overall and maintenance thereof does not involve particular problems.

The Int'l. Pat. Appl. Publ. No. WO20051002405 in the name of the applicant describes an espresso coffee machine comprising a water storage tank, a pump for delivering said water to a boiler, a unit supplying the hot water and filter-holder means able to contain a measure of coffee powder, which is preferably pre-packaged: said supply unit and said filter-holder means are sealingly engaged with each other and the path of the engaging movement lies in a plane substantially perpendicular to the middle plane of engagement of said supply unit and said filter-holder means, the surfaces of said unit which supply said filter-holder means coming into contact only upon engagement of the latter.

This machine has numerous undoubted advantages compared to the machines of the known type; however, a drawback consists in the fact that the capsule is not ejected from the filter holder using simple means which are able to operate immediately after extraction of the coffee infusion. In fact, if it is required to prepare a coffee immediately after one which has just been made, it is necessary to wait a few minutes until the capsule cools and can be handled, or it is necessary to use special instruments such as, pincers, for example, which make the operation decidedly unpractical.

BRIEF SUMMARY OF THE INVENTION

The object of the present invention is therefore to provide a machine which is able to eject automatically the used pre-packaged capsules immediately after they have undergone extraction, without any complex and costly modifications being made to the structure thereof.

The present invention relates to an espresso coffee machine comprising a unit supplying the hot water, and filter-holder means able to contain a pre-packaged measure of coffee powder, said supply unit and said filter-holder means being sealingly engaged with each other and the path of the engaging movement lying in a plane substantially perpendicular to the middle plane of engagement of said supply unit and said filter-holder means, the surfaces of said unit supplying said filter-holder means coming into contact only upon engagement of the latter; said machine comprises an ejection member arranged in the vicinity of the periphery of said supply unit and projecting perpendicularly with respect to the middle plane of engagement of said supply unit and said filter-holder means, said ejection member being provided at its free end with means able to co-operate with the outwardly lying edge of said pre-packaged capsule projecting outwards from said filter-holder means, so as to cause ejection thereof upon separation of the filter-holder means from said supply unit.

In a preferred embodiment, said ejection member comprises an arm which is resiliently stressed, connected at one end to the wall of said machine in the vicinity of said supply unit and provided at the opposite end with means for engaging with the peripheral edge of said pre-packaged capsule. In another preferred embodiment, the middle plane of engagement of said supply unit and said filter-holder means is perpendicular to the base plane of the body of the machine; said filter-holder means comprise a closing flap which is hinged at one end with the body of said machine, the opposite end being provided with releasable engaging means intended to engage with suitable engaging means provided on the wall of the body of said machine.

Advantageously, the engaging means of said closing flap are formed so that they take up the play existing between the closing flap and the body of the machine.

BRIEF DESCRIPTION OF THE DRAWINGS

Further advantages and characteristic features of the present invention will emerge from the following detailed description of an embodiment thereof, provided by way of a non-limiting example, with reference to the accompanying illustrative drawings in which.

DETAILED DESCRIPTION OF THE INVENTION

Figure 1:
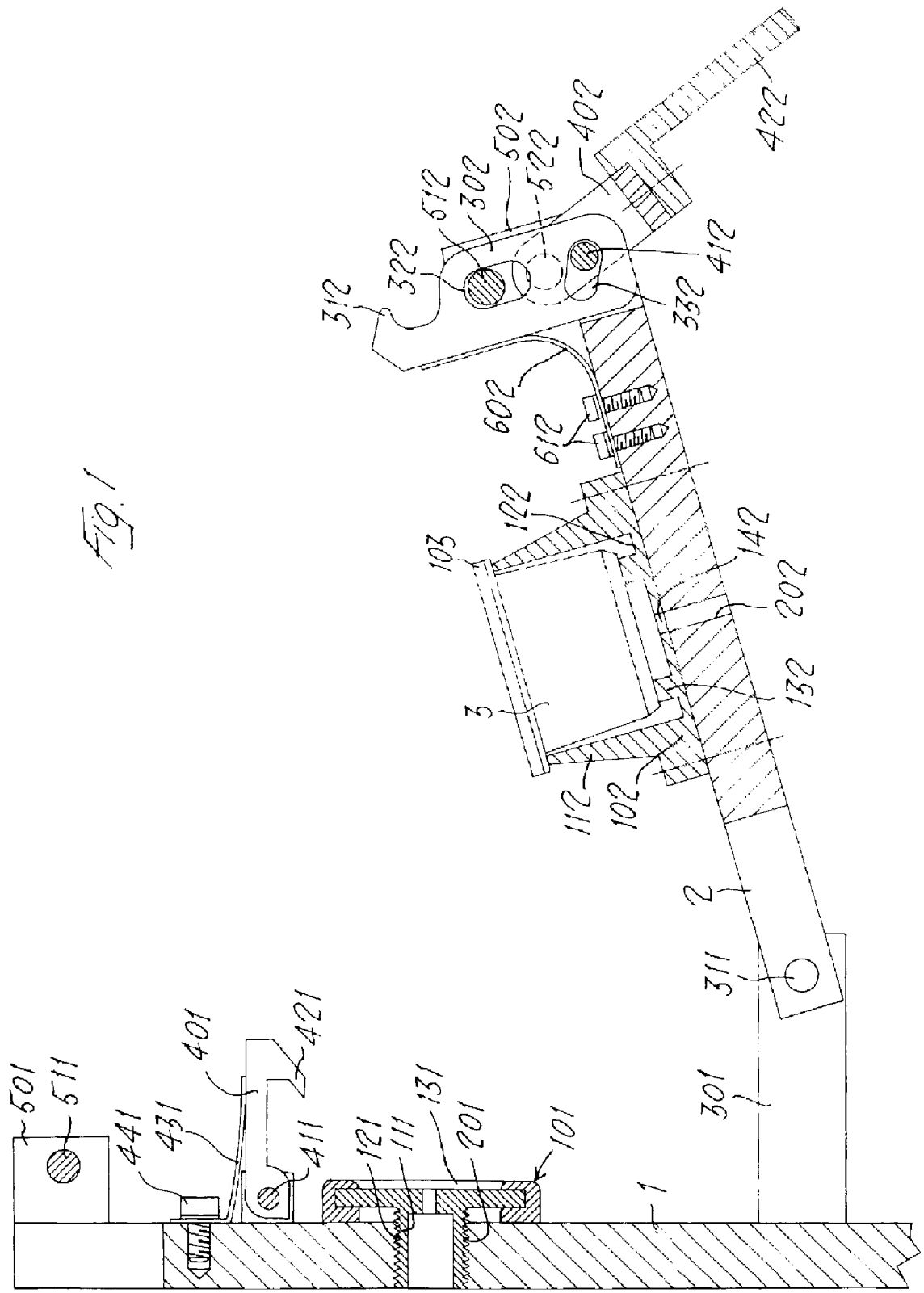
FIG. 1 is a side elevation view with parts cross-sectioned of a detail of an embodiment of the machine according to the present invention, shown at the moment of insertion of the pre-packaged capsule.

FIG. 1 shows a detail relating to an embodiment of the invention; 1 denotes the wall of the body of the machine according to the present invention. The wall 1 has the threaded hole 201 inside which the unit 101 supplying hot water under pressure is inserted by means of engagement between the end-piece 111 provided with the thread 121 and the threaded hole 201; the unit is provided with a supply spray head 131. The wall 1 has, projecting from it, below the unit 101, the supports 301, on which the closing flap 2 carrying the filter-holder means 102 is engaged by means of the pins 311. The arm 401 which is pivotably engaged at one end with the wall 1 by means of the pin 411 is situated immediately above the unit 101, while at the other end it has the hook 421. The arm 401 is resiliently stressed by the spring 431 attached to the wall 1 by means of the screw 441. Finally, the projecting bracket 501 on which the bar 511 is arranged is positioned at the top end of the wall 1.

The filter holder 102 is situated substantially in the centre of the closing flap 2 and has a cavity 122, the external side walls 112 of which are tapered towards the outwardly lying edge. The bottom of the cavity 122 has, formed therein, an axially projecting annular relief 132 which supports the pre-packaged capsule 3 of coffee powder, provided with a radially projecting flange 103 which is situated on the outwardly lying edge of the cavity 122. An axial hole 142 communicating with the duct 202 formed in the closing flap 2 is formed in the centre of the bottom wall of the cavity 122. The end of the closing flap 2 opposite to that connected to the supports 301 has, arranged thereon, a projecting bracket 502 provided with a transverse bar 512 on which there is mounted, by means of the through-eyelet 322, the latch 302 provided at one end with the tooth 31 2, the other end thereof being pivotably connected to the pin 412 of a lever 402, by means of the through-eyelet 332. The lever 402 is provided at one end with the grip 422 and at the opposite end is pivotably connected to the pin 522 fastened to the bracket 502. The latch 302 is resiliently stressed by the spring 602 which is fixed at one end to the closing flap 2 by means of the screws 612.

Figure 4:
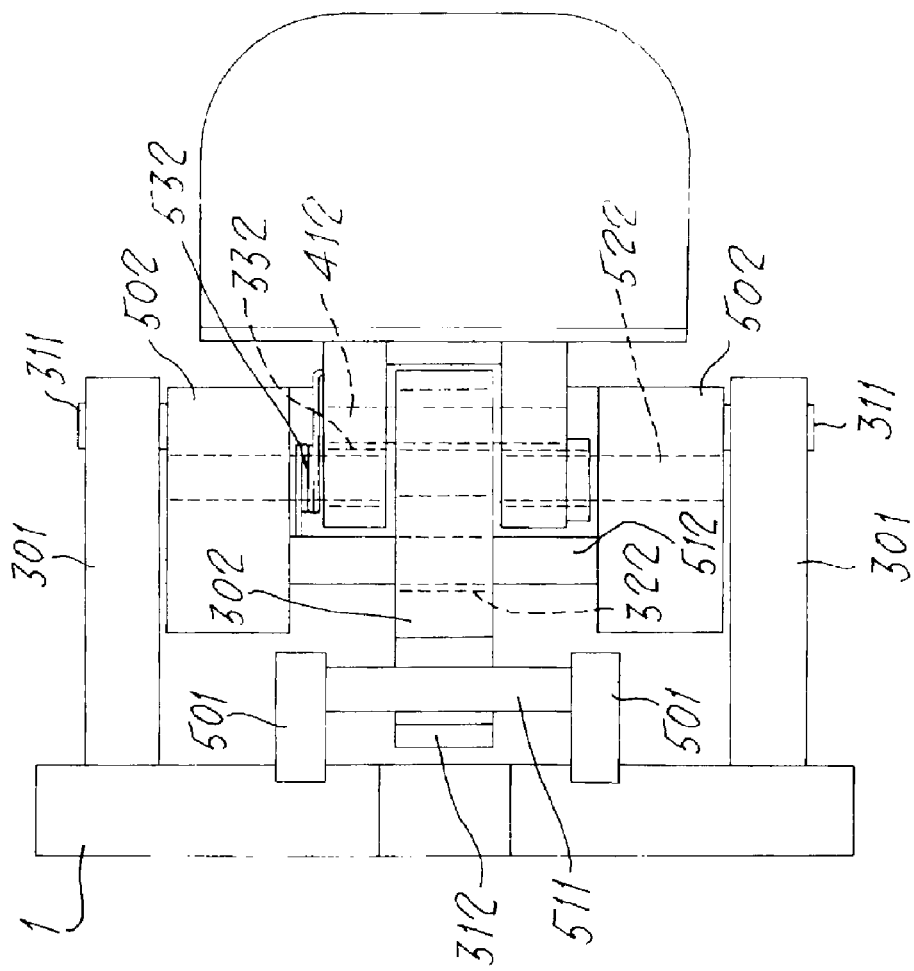
FIG. 4 is a top plan view of the detail of the machine in the configuration shown in FIG. 2.

FIG. 4 clearly shows the system for closing the closing flap 2 onto the wall 1 of the machine according to the invention; the same numbers are used to identify identical parts. In particular, it can be seen how the lever 402 is stressed resiliently by means of a spring 532 wound around the pin 522 and locked at its other end by the bar 512.

Figure 2:
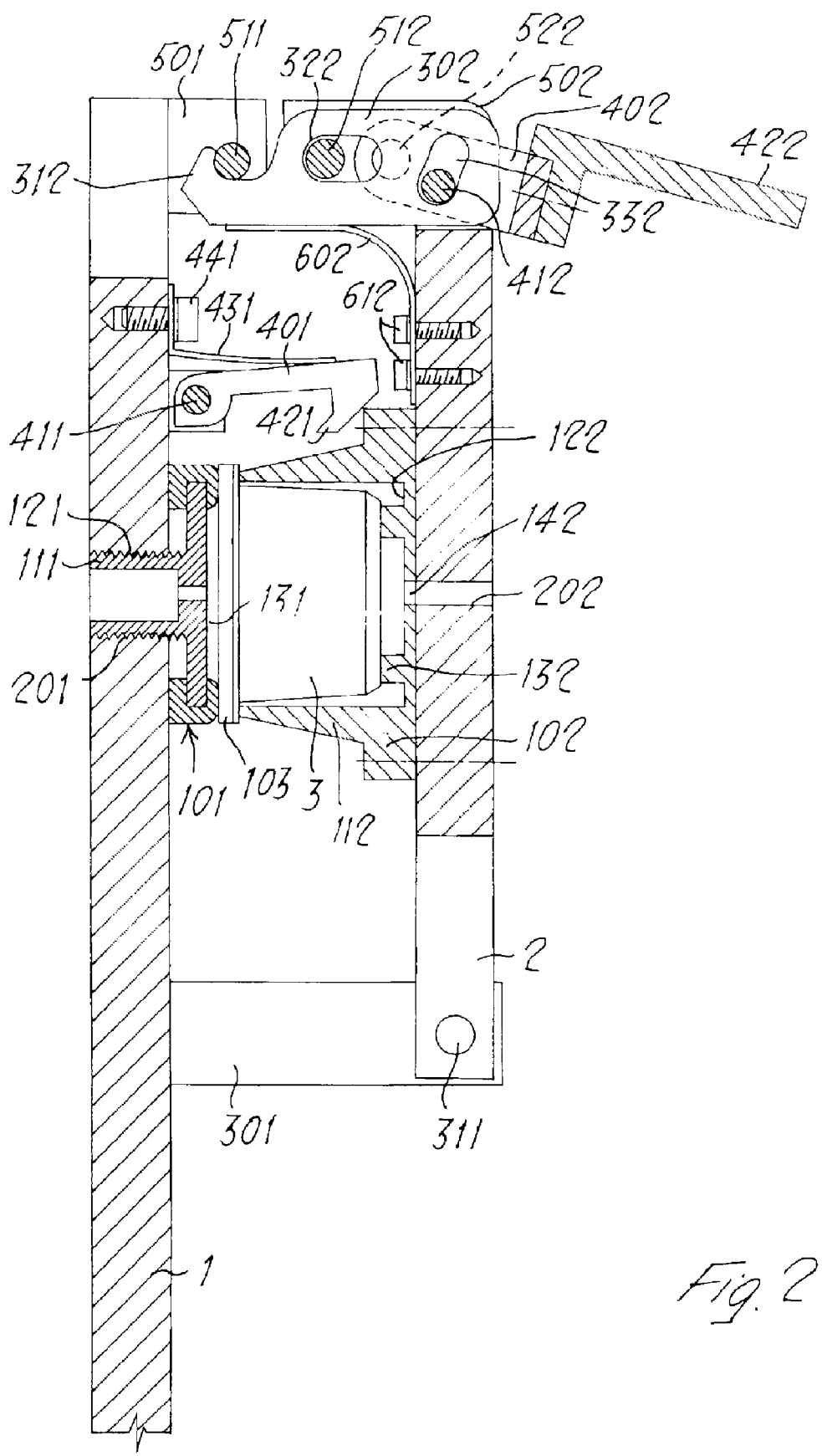
FIG. 2 is a view similar to that of FIG. 1, with the machine shown during dispensing of the coffee infusion.

The operating principle of the machine according to the invention will become clear from that indicated below, with reference to that shown in FIGS. 2 and 3. After insertion of the pre-packaged capsule 3 in the filter holder 102, the closing flap 2 is closed against the wall 1 of the machine in the manner shown in FIG. 2. In this situation the tooth 312 of the latch 302 engages on the bar 511 of the bracket 501 and closing is performed by pushing the lever 402 downwards until it is brought into the position shown. The unit 101 may supply hot water under pressure and the coffee infusion is formed. It should be noted that the latch 302, pivoting with respect to both the bar 512 of the bracket 502 and the pin 412 of the lever 402, allows closing of the closing flap able to take up any play and ensure sealed engagement of the filter holder 102 and the supply unit 101.

Figure 3:
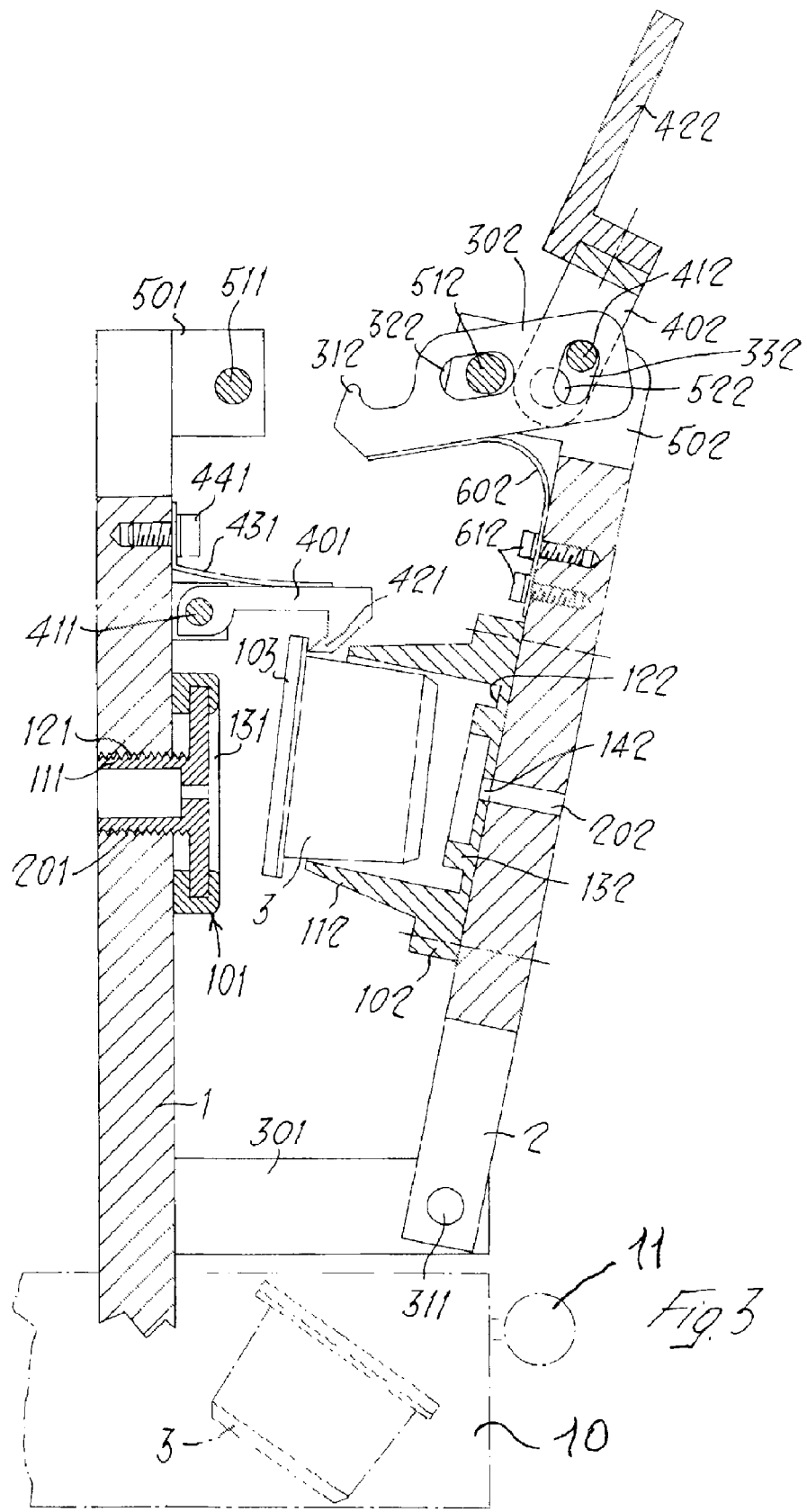
FIG. 3 shows the step involving ejection of the capsule after dispensing.

During the next step, shown in FIG. 3, the latch 302 is opened, releasing its tooth 312 from engagement with the bar 511, by pushing the handle 422 of the lever 402 upwards; with the movement of the closing flap 2 away from the wall 1, the hooked end 421 of the arm 401, which during the previous step rested against the external side wall of the filter holder 102, enters into contact with the radial flange 103 of the used pre-packaged capsule 3. As can be clearly seen, the capsule 3 will be extracted from the cavity 122 and will be able to fall, for example into the receiving drawer 10, shown in dot-dash lines in the figure, the ejected capsule also being shown in dot-dash lines and indicated by the number 3'. The drawer 10 is inserted in an extractable manner in the frame of the coffee machine and provided with a gripping handle 11. The machine will therefore be ready for introduction of a new pre-packaged capsule of coffee powder. It is obvious that there must be a through-gap between the wall 1 of the machine and the closing flap 2 such as to allow the capsule 3 to pass through towards the drawer 10. This gap in the embodiment shown is obtained by leaving free the space situated between the supports 301 which project from the wall 1 and with which the closing flap 2 is hinged, the wall 1 and the closing flap 2. Obviously, it would be equally effective to have an opening formed in the wall underneath the supply unit 101 and in communication with the drawer 10; in this case it would not be necessary to provide any through-gap between closing flap 2 and wall 1, and the closing flap would act as a discharge chute.

The machine designed in this way solves in an extremely simple manner the problem of ejection of the used coffee powder capsules, with an obvious increase in the safety and ease of use, as well as cleanliness, owing to the fact that the capsule ejected from the machine does not have to be handled directly by the user.

What is claimed is:

1. An espresso coffee machine comprising a supply unit (101) supplying hot water; and filter-holder means (2, 102) for containing a pre-packaged measure (3) of coffee powder; said supply unit (101) and said filter-holder means (2, 102) being sealingly engaged with each other along a path of engaging movement, said path of engaging movement lying in a plane substantially perpendicular to a middle plane of engagement of said supply unit (101) and said filter-holder means (2, 102), surfaces of said supply unit (101) and said filter-holder means (2, 102) coming into contact only when said filter holder means engages said supply unit; and an ejection member (401) arranged in a vicinity of a periphery of said supply unit (101) and projecting perpendicularly with respect to the middle plane of engagement of said supply unit (101) and said filter-holder means (2, 102), said ejection member (401) being provided at its free end with means (421) co-operating with an outwardly lying edge (103) of said pre-packaged capsule (3) projecting outwards from said filter-holder means (2, 102), so as to cause ejection thereof upon separation of the filter-holder means (2, 102) from said supply unit (101).

2. The machine of claim 1, wherein said ejection member comprises an arm (401) which is resiliently stressed (431), connected at one end to the wall (1) of said machine in the vicinity of said supply unit (101) and provided at the opposite end with means (421) for engaging with the peripheral edge (103) of said pre-packaged capsule (3).

3. The machine of claim 1, wherein the middle plane of engagement of said supply unit (101) and said filter-holder means (102) is perpendicular to the base plane of the body of the machine.

4. The machine of claim 1, wherein said filter-holder means comprise a closing flap (2) hinged at one end with the body (1, 301) of said machine, the opposite end being provided with releasable engaging means (302, 402) intended to engage with suitable engaging means (501, 511) provided on the wall of the body of said machine.

5. The machine of claim 1, wherein said filter-holder means comprises a filter holder (102) comprising a substantially cylindrical cavity (122) and an external side wall (112) tapered towards the outwardly lying edge of said cavity (122).

6. The machine of claim 1, wherein said releasable engaging means of said closing flap comprises a latch (302) provided at one end with an engaging tooth (312) and pivoting centrally with respect to a pin (512) integral with said closing flap (2) and at the opposite end with respect to a pin (412) integral with an actuating lever (402).

7. The machine of claim 6, wherein said latch (302) is provided with resilient stressing means (602) connected to said closing flap (2).

8. The machine of claim 3, wherein the zone situated underneath said supply unit (101) is provided with a through-gap for discharging a used capsule (37), communicating with a receiving container (10) arranged extractably in said machine.

9. An espresso coffee machine comprising a unit (101) supplying hot water, and filter-holder means (2, 102) able to contain a pre-packaged measure (3) of coffee powder, said supply unit (101) and said filter-holder means (2, 102) being sealingly engaged with each other and the path of engaging movement lying in a plane substantially perpendicular to a middle plane of engagement of said supply unit (101) and said filter-holder means (2, 102), surfaces of said unit (101) and said filter-holder means (2, 102) coming into contact only when said filter holder means engages said supply unit, in which said filter-holder means comprise a closing flap (2) hinged at one end with the body (1, 301) of said machine, an opposite end being provided with releasable engaging means (302, 402) intended to engage with suitable engaging means (501, 511) provided on a wall of the body of said machine, wherein said machine comprises an ejection member (401) arranged in a vicinity of a periphery of said supply unit (101) and projecting perpendicularly with respect to the middle plane of engagement of said supply unit (101) and said filter-holder means (2, 102), said ejection member (401) being provided at its free end with means (421) able to co-operate with the outwardly lying edge (103) of said pre-packaged capsule (3) projecting outwards from said filter-holder means (2, 102), so as to cause ejection thereof upon separation of the said filter-holder means (2, 102) from said supply unit (101).

10. The machine according to claim 9, in which said ejection member comprises an arm (401) which is resiliently stressed (431), connected at one end to the wall (1) of said machine in the vicinity of said supply unit (101) and provided at the opposite end with means (421) for engaging with the peripheral edge (103) of said pre-packaged capsule (3).

11. The machine according to claim 9, in which the middle plane of engagement of said supply unit (101) and said filter-holder means (102) is perpendicular to the base plane of the body of the machine.

12. The machine according to claim 9, in which said filter-holder means comprise a filter holder (102) comprising a substantially cylindrical cavity (122) and an external side wall (112) tapered towards the outwardly lying edge of said cavity (122).

13. The machine according to claim 9, in which said releasable engaging means of said closing flap comprise a latch (302) provided at one end with an engaging tooth (312) and pivoting centrally with respect to a pin (512) integral with said closing flap (2) and at the opposite end with respect to a pin (412) integral with an actuating lever (402).

14. The machine according to claim 9, in which said latch (302) is provided with resilient stressing means (602) connected to said closing flap (2).

15. The machine according to claim 9, in which the zone situated underneath said supply unit (101) is provided with a through-gap for discharging a used capsule (3), communicating with a receiving container (10) arranged extractably in said machine.

16. An espresso coffee machine comprising:
a wall;
a unit for supplying hot water, said unit being directly connected to said wall;
a first engaging means being directly connected to said wall;
a support being directly connected to said wall;
a flap being directly hinged at its first end on said support and being rotatable towards and away from said wall;
a filter holder for holding a pre-packaged capsule, said filter holder being directly connected to said flap;
an ejection member for ejecting the pre-packaged capsule, said ejection member being directly connected to said wall;
a second engaging means for releasably engaging with said first engaging means, said second engaging means being disposed at a second end of said flap;
wherein
a pre-packaged capsule inserted into said filter holder is sealingly engaged with said unit for supplying hot water when said second engaging means is engaged with said first engaging means; and
said ejection member, projecting into a path of rotation of the pre-packaged capsule, engages with the pre-packaged capsule, and ejects the pre-packaged capsule from said filter holder during rotation of said flap away from said wall.

17. The espresso coffee machine of claim 16, wherein said ejection member comprises an arm which is resiliently stressed having a hook, said hook being adapted to hook onto a flange of the pre-packaged capsule.

18. The espresso coffee machine of claim 17, wherein said first engaging means comprises a projecting bracket and a bar; said second engaging means comprises a latch, having a tooth, said latch being resiliently stressed, and said tooth engages with said bar when said flap is fully rotated toward said wall.

19. The espresso coffee machine of claim 18, wherein said filter holder comprises a substantially cylindrical cavity having an outwardly lying edge and an external side wall, said external side wall is tapered towards said outwardly lying edge; and said hook glides along said external side wall when said flap rotates towards and away from said wall.

20. The espresso coffee machine of claim 19 comprising further a through-gap for discharging the pre-packaged capsule, said through-gap formed between said wall and said flap and said through-gap communicating with a receiving container arranged extractably in the machine, said through-gap being adapted to receive and pass through the pre-packaged capsule ejected from said filter holder.

\* \* \* \* \*